Oct. 18, 1932.   H. E. JACKSON   1,883,292

SHOCK ABSORBER

Filed Jan. 13, 1931

INVENTOR.
Harold E. Jackson
BY
Parker & Burton
ATTORNEYS.

Patented Oct. 18, 1932

1,883,292

UNITED STATES PATENT OFFICE

HAROLD E. JACKSON, OF DETROIT, MICHIGAN

SHOCK ABSORBER

Application filed January 13, 1931. Serial No. 508,512.

My invention relates to improvements in hydraulic shock absorbers adapted for motor vehicle use.

An object of my invention is to provide a simple shock absorber which will function equally well in both directions and which is adjustable to regulate the resistance it imposes upon relative movement of the sprung and unsprung parts of the vehicle.

An important feature is the provision of an adjustment to regulate the exhaust of liquid from the high compression chamber which adjustment is operable externally the casing of the shock absorber and which is of such a character that the variation of the liquid passage is in direct and uniform proportion to the movement of the adjustment device. In other words, a given movement of the adjustment device at any stage within the range of its normal adjustment will in each case produce the same degree of variation in the liquid exhaust passageway leading from the high pressure chamber.

Another object resides in the provision of particular valve mechanism to admit fluid into the high pressure chamber. A feature of importance is also the arrangement of the valve mechanism which controls the exhaust fluid in the high pressure chamber in such a manner that it will not readily clog or foul with dirt or scrapings from the chamber wall which might otherwise have a tendency to block the passageway.

An important characteristic of my invention is that the valve is so constructed as to always permit escape of liquid, never completely closing, and the provided opening is so shaped as to be relatively free from clogging or obstruction with dirt.

A modified form of my invention exhibits, in addition to the characteristics heretofore mentioned, a construction capable of yielding under extraordinary shock to permit more rapid escape of liquid. This protects the structure from damage due to heavy shock, permits cleaning away of obstructions of dirt or foul matter automatically upon yielding of the valve, and provides other valuable features.

Other objects and advantages will more fully appear from the following description, appended claims and accompanying drawing wherein Fig. 1 is an elevation partly in section of my improved shock absorber.

Figure 1:
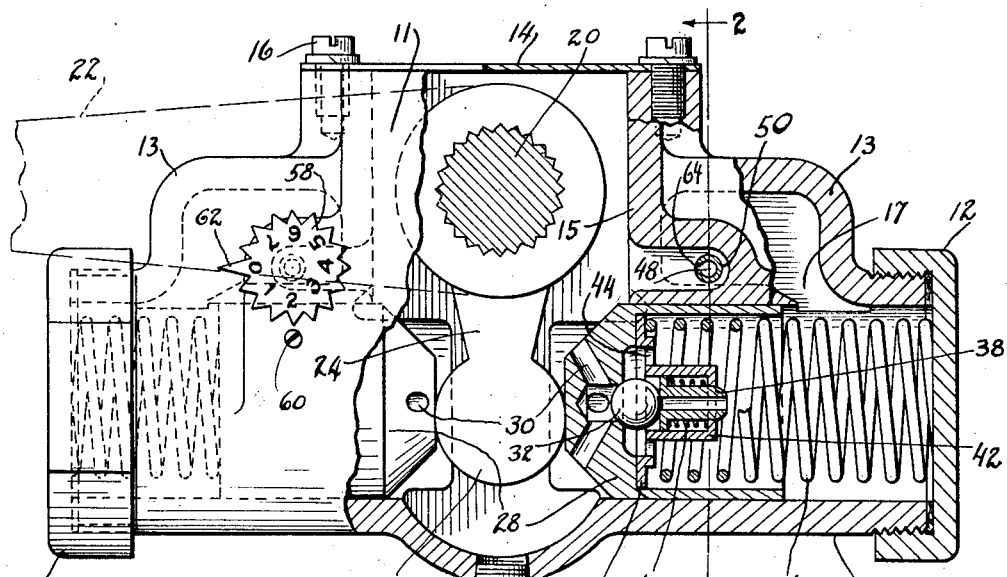

In the embodiment of my invention shown in the drawing, there is a generally cylindrical shock absorber casing 10 which is closed at opposite ends by a screw cap 12 to serve as a fluid container. A cover plate 14 is held in place by stud bolts 16 and a drain plug 18 is provided through the lower wall of the casing. The casing has an intermediate portion which extends above the generally cylindrical portion and provides a bearing for a shaft 20 upon which is mounted an arm 22 which is suitably connected with one of the moving parts of the vehicle so as to respond to relative movement between the sprung and unsprung parts of the vehicle. This shaft 20 carries an arm 24 upon the end of which is disposed a ball 26 which is arranged between a pair of pistons 28 to actuate said pistons.

Each piston is cored out as shown in Fig. 1, and the head of the piston is provided with a plurality of liquid passageways 30 which lead through the head of the piston and terminate in an opening therethrough controlled by ball check valve 32 which is held to its seat by a plunger 38, which plunger is held yieldingly against the ball check valve by a spring 40 and which spring and plunger are mounted within the crown portion of a hatshaped valve cage 42. The rim of the hat-shaped valve cage is provided with a plurality of liquid passageways 44 through which liquid may flow upon the unseating of the ball check valve 32 from the intermediate portion of the casing into the end portion. A spring 46 bears at one end against the end of the casing and at the opposite end against the rim of the hat-shaped valve cage, holding it seated within the piston and holding the piston towards the center of the casing so as to return the piston to its normal inoperative position.

The intermediate portion 11 of the casing has extensions 13 which overhang each of the cylindrical ends and a partition wall 15 is provided to separate the intermediate portion from each end portion because it will be seen that each end portion of the piston is cut away within the extension 13 providing a passageway 17 that communicates with the end portion of the piston and into which fluid may rise. The upper portion of the passageway or recess 17 may serve as an air pocket within which air is trapped and it will serve as the first cushion to the movement of the piston inwardly against the fluid in the end of the chamber.

The shock absorber casing is filled to the desired height with suitable liquid and the liquid flows through the end of each piston into the end of portions of the chamber which serve as the high pressure compartments. The liquid is then exhausted from each high pressure compartment upon the movement of the piston into such high pressure compartment. It is exhausted from the passageway or pocket 17 through the opening 48 into the intermediate or low pressure compartment of the casing.

Figure 2:
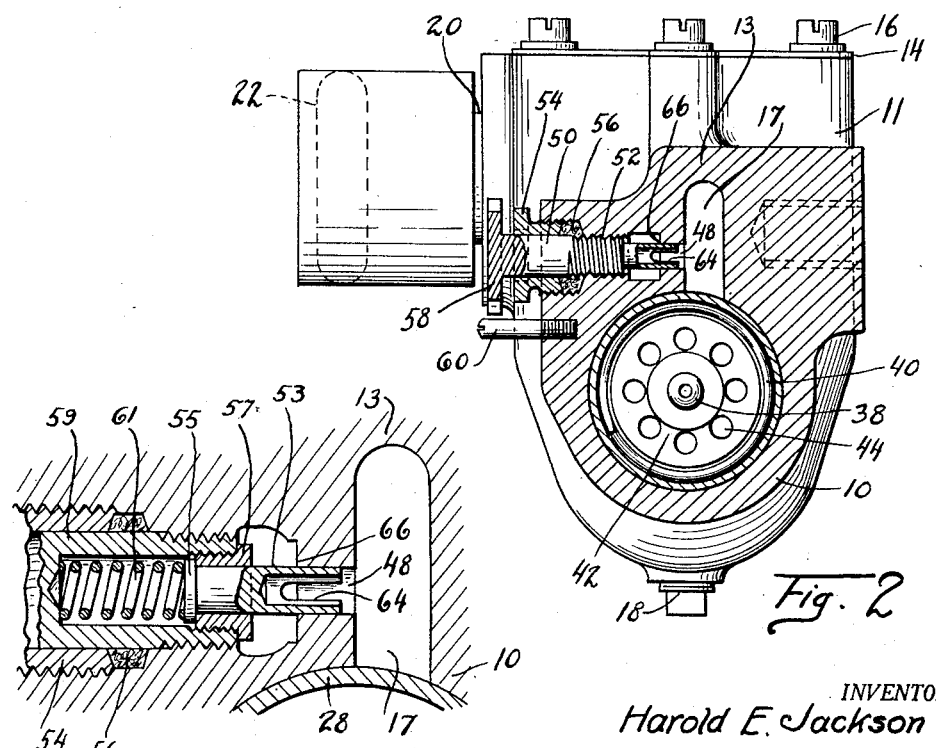
Fig. 2 is a sectional view taken on line 2—2 of Fig. 1.

Valve mechanism is provided to regulate the flow of liquid through this passageway 48. This valve mechanism includes, in the construction shown in Fig. 2, a rotatable valve member 50 which is threaded into the casing wall at 52 and which extends through a threaded packing nut 54 and suitable packing 56. This valve member is provided on its outer end with a knurled head 58 by which it may be manipulated. A stop pin 60 is carried by the casing wall and is adapted to engage a projecting finger 62 on the knurled head to limit its rotation. The valve is so constructed and mounted and the stop pin 60 is so located that the valve always provides a minimum opening and is never completely closed. The finger 62 will engage the stop pin before the valve can be rotated to a point of complete closure. The head may carry, as shown, numerals indicating different positions of adjustment. Rotating of the external adjustable member through any unit of adjustment will enlarge the metered opening uniformly.

The valve member extends through, it will be seen, the low pressure compartment to seal the opening 48 leading from the high pressure compartment into the low pressure compartment so that the mounting of the valve in the outside wall of the casing is not subjected to the high pressures which it would otherwise be subjected to if the valve extended directly into the high pressure compartment through the exterior casing wall. The end of the valve member is tubular and has a sliding fit within the opening 48 and is cut away or slotted as at 64 and this slot is adjusted by rotation of the valve with respect to a true face 66 so as to regulate the extent of liquid opening. The size of the slot is such and the rotation of the valve member varies the same in such a way that there is very little tendency for the slot to become clogged with fouled matter which would obstruct the flow of liquid as is the case with an adjustable needle valve.

The rotatable adjustment of the valve member varies the opening established by the slot as it traverses the true valve face in such a manner that for any given unit of rotatable adjustment of the valve member, throughout its normal range of adjustment, the variation of the liquid passageway is uniform. In other words, rotation through a given unit of adjustment during the last stage of the normal range of adjustment will increase the opening to exactly the same extent that rotation through the same unit at the beginning of the normal stage of adjustment increases the opening.

Figure 3:
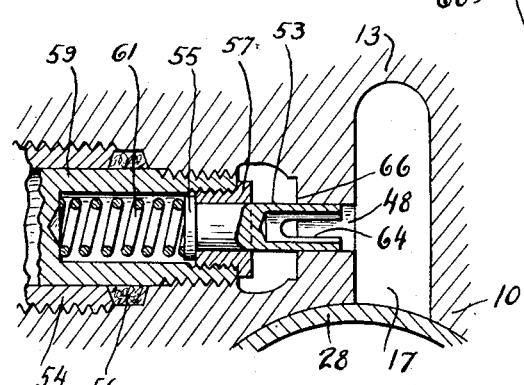
Fig. 3 is an enlarged fragmentary elevation of a modified form taken on the same line as Fig. 2.

In the construction shown in Fig. 3 the valve member is indicated as 53. In this form this valve member is of the plunger type and has a head 55. It is mounted directly in a nut 57 which is carried by a rotatably adjustable screw member 59 threaded in the casing wall and projecting exteriorly thereof for rotatable adjustment. The screw member is hollowed out providing a recess within which is disposed a stiff spring 61 which holds the valve to its seat as shown in Fig. 3, except where there is unusual fluid pressure such as when the aperture is partly clogged and a pronounced shock occurs. This construction exhibits a valve face cooperating with the valve member to establish the liquid metering opening and a valve seat, nut 57, which cooperates with the head of the valve member to determine the minimum open position of the valve. This spring not being subjected to frequent action will retain for an indefinite period its functioning capacity.

What I claim is:

1. A hydraulic shock absorber having a high compression chamber and a low compression chamber communicating through a liquid passageway controlled by valve mechanism, a slotted tubular valve member slidably receivable within the liquid passageway, rotatable screw means adjustable exteriorly of the casing to adjustably position said valve member, spring means holding said valve member at each adjusted position yieldable only under extraordinary liquid pressure to open said valve further.

2. A hydraulic shock absorber having a high compression chamber and a low compression chamber communicating through a liquid passageway controlled by valve mechanism, a slotted tubular valve member slidably receivable within the liquid passageway, rotatable screw means adjustable exteriorly of the casing to determine adjusted minimum open positions of said valve, a head on said valve engaging said screw means, a spring engaging said head holding said valve to each minimum open position yieldable under extraordinary liquid pressure to vary the minimum open position of said valve.

3. A hydraulic shock absorber having a high compression chamber and a low compression chamber communicating through a liquid passageway controlled by valve mechanism, a slotted tubular valve member slidably receivable within the liquid passageway, spring means holding said valve member at a determined normal position yieldable under liquid pressure against said valve member to permit the valve member to open, and rotatable screw means adjustable exteriorly of the casing to determine the adjusted normal position of said valve member.

4. A hydraulic shock absorber having a high compression chamber and a low compression chamber communicating through a liquid passageway controlled by valve mechanism, a slotted tubular valve member slidably receivable within the liquid passageway, spring means holding said valve member at a determined normal position yieldable under liquid pressure against said valve member to permit the valve member to open, and rotatable screw means adjustable exteriorly of the casing to determine the adjusted normal position of said valve member, said valve member being slidably mounted within said rotatable screw means, said spring means being disposed within said rotatable screw means and bearing at one end thereagainst and at the other end against the end of the slidable valve member to hold the same normally projected outwardly.

In testimony whereof, I sign this specification.

HAROLD E. JACKSON.